US006764230B1

(12) United States Patent
Karacsony et al.

(10) Patent No.: US 6,764,230 B1
(45) Date of Patent: Jul. 20, 2004

(54) OPTICAL FIBER SPLICING DEVICE

(75) Inventors: Istvan Karacsony, Stockholm (SE); Ola Hulten, Bromma (SE)

(73) Assignee: Future Instruments Fiber Optics AB, Solna (SE)

( * ) Notice: Subject to any disclaimer, the term of this patent is extended or adjusted under 35 U.S.C. 154(b) by 0 days.

(21) Appl. No.: 10/393,396

(22) Filed: Mar. 21, 2003

(51) Int. Cl.[7] .............................................. G02B 6/255
(52) U.S. Cl. ......................................... 385/98; 385/97
(58) Field of Search ............................. 385/98, 97, 58, 385/62, 63, 65

(56) References Cited

U.S. PATENT DOCUMENTS

| | | | | |
|---|---|---|---|---|
| 4,096,010 A | * | 6/1978 | Parham et al. ............. | 156/179 |
| 5,961,865 A | * | 10/1999 | Esmaeili et al. ............ | 219/383 |
| 6,434,314 B1 | * | 8/2002 | Gatica et al. ............... | 385/136 |
| 6,487,939 B1 | * | 12/2002 | Cowher et al. ............. | 81/9.51 |
| 6,665,483 B2 | * | 12/2003 | Gatica ........................ | 385/136 |

* cited by examiner

Primary Examiner—Chandrika Prasad
(74) Attorney, Agent, or Firm—Nixon & Vanderhye P.C.

(57) ABSTRACT

An optical fiber splicing device has guide grooves for aligning fiber ends. The fibers ends are held in the grooves by hold-down means including cylindrical pressing surfaces which are capable of rotating freely. Due to the free rotation, when lowering the hold-down means to hold the fiber ends, no longitudinal displacement of the fiber ends will occur and the fiber ends maintain their initial positions. The fiber ends are, after the holding operation having been completed, moved linearly, sliding in the guide grooves, an accurate linear movement being obtained from double parallelogram structures. Electrodes between which an electric arc is formed for heating the fiber ends at a splice position to fusion splice them to each other are given accurate, predetermined positions by means of adjustable positioning rings mounted to the electrodes. The splice position is illuminated by light emitted in a relatively small angle in relation to the electrode axis, this giving a very compact splicing device having a small total height.

19 Claims, 7 Drawing Sheets

OPTICAL FIBER SPLICING DEVICE

TECHNICAL FIELD

The present invention relates to a fiber splicing device for splicing optical fibers to each other and to subassemblies used in a fiber splicing device.

BACKGROUND

When handling optical fibers intended for telecommunication in connection with splicing, movable holders, clamps or clips are used, which generally have the shape of low rectangular blocks including lids, which securely hold or clamp the fiber or fibers. Such a holder including an inserted fiber is placed in a more or less accurate way in the machine or device used, such as on movable blocks in a fiber splicing machine, see for example Swedish patent No. 9300578-3, publication No. SE 500915, which discloses a splicing device for splicing fiber ribbons using a parallelogram structure allowing a movement that is nearly but not perfectly linear. The deviation from a linear movement causes problems in those cases where a very accurate positioning of the fibers is required.

A fiber splicing device for splicing primarily ribbon fibers is disclosed in U.S. Pat. No. 5,961,865 and it includes e.g. electrodes placed and secured in an electrode housing, and fiber hold-down means to securely press the fiber ends into guiding V-grooves. The fiber hold-down means comprise a pressing assembly mounted at a pressing-down arm and having flat surfaces at bottom ends of elastically biased, movable pressing blocks. In the pressing-down movement said flat surfaces may not move perfectly perpendicular to the fibers, this causing the fibers to slightly move in the fiber longitudinal direction, resulting in splices that are not made in an optimum way and hence e.g. can have a too large optical loss. The disclosed splicing device also has light illuminating means emitting light hitting cameras, the light path from the illuminating means passing the splice position in a relatively large angle in relation to the common longitudinal axes of the electrodes, this giving the splicing device a large total height so that it cannot be easily handled, in particular when used in the field.

SUMMARY

It is an object of the invention to provide a fiber splicing device having improved means for holding a fiber in a guiding or alignment groove.

It is another object of the invention to provide a fiber splicing device having means allowing an accurate linear movement of fiber holders.

It is another object of the invention to provide a fiber splicing device having electrodes which have points located at accurate positions in the relation to a splicing position.

It is another object of the invention to provide a fiber splicing device having a small total height.

It is another object of the invention to provide a fiber splicing device that can be easily handled.

A device for splicing optical fibers to each other comprises in the conventional way fiber retaining or holding means and some heating means for heating fibers at a splice position, such as electrodes between the points of which an electric arc is formed at the splice position, for fusion splicing the fibers to each other. Guiding grooves are used for aligning the ends of the fibers with each other. The guiding grooves can be formed in a surface of an alignment block. Hold-down means press and retain the fiber ends in the guiding grooves. In order not to give any longitudinal displacement of the fibers ends in the operation when the holding down-means are brought into contact with the fiber ends, the hold-down means include elastically biased, circular-cylindrical surfaces acting to press on the free, top surfaces of the fiber ends, the cylindrical surfaces being surfaces of elements that are mounted to rotate freely. The circular-cylindrical surfaces are preferably the outer surfaces of the outer races of roller bearings. The inner races of the bearings can be attached to an elastically biased hold-down assembly that is mounted to move in a holding arm. The holding arm can be mounted to swing or be folded down and up, to a swung-down position in which the hold-down means press on the fiber ends and a swung-up position in which the fiber ends are exposed and free. Some means such as a weight mounted to the holding arm can be used, arranged to firmly hold the holding arm in the swung-down position thereof.

The splicing device further can comprise a multiple parallelogram structure allowing very accurately linear displacements of at least one part thereof, such as of a fiber holding portion. The parallelogram structure includes at least two individual parallelograms, each having a free, stiff outer side. Their inner sides are formed by a common, stiff fiber holding portion. The fiber holding portion is attached to the free outer sides through lateral interior sides of the parallelograms. These lateral sides have the shape of thin plates and they are so thin that they can be elastically bent. This bending is performed in only one plane due to the fact that the lateral sides are of an elastic but still relatively stiff material such as a metal, typically aluminum or steel, to the flat strip-like shape of the sides and to their rigid attachment to or continuation into the relatively totally stiff outer and inner sides.

The parallelogram structure can further comprise at least one end portion and a center portion which are rigidly attached to a base of the device. The free outer sides of the parallelograms are then attached to the end portion and the center portion through lateral exterior sides having a shape substantially identical to that of the lateral interior sides and allowing a bending in only one plane. The interior and exterior lateral sides are then arranged in pairs so that the interior and exterior sides of such a pair extends at the sides of and in parallel to each other at a constant distance of each other.

The electrodes if used can as conventional have substantially smooth, cylindrical main portions continuing into electrode points. The electrodes may be provided with positioning rings. An electrode housing then has electrode grooves or recesses for mounting the electrodes. The positioning rings can include inner cutting edges penetrating into the surface material of the main portions and are located at a predetermined distance from the point of the respective electrode. The rings are received by positioning grooves in an electrode housing, the grooves having a width substantially agreeing with that of the rings, this giving the electrode points accurate, predetermined positions.

The splicing device can further comprise a hold-down base that is attached to the electrode housing and includes an upstanding portion. A light source may be mounted in the upstanding portion to illuminate the splicing position between the electrode points, the path of the illuminating light hitting the light sensitive surface of a camera having a relatively small angle in relation to the longitudinal axis of the electrodes. The hold-down base can also secure one of the electrodes in the electrode groove or recess provided therefor.

The relatively small angle of the illumination path can be at most 30° in relation to the common axis of the electrodes or generally in the range of 15–30° and preferably substantially 25°.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
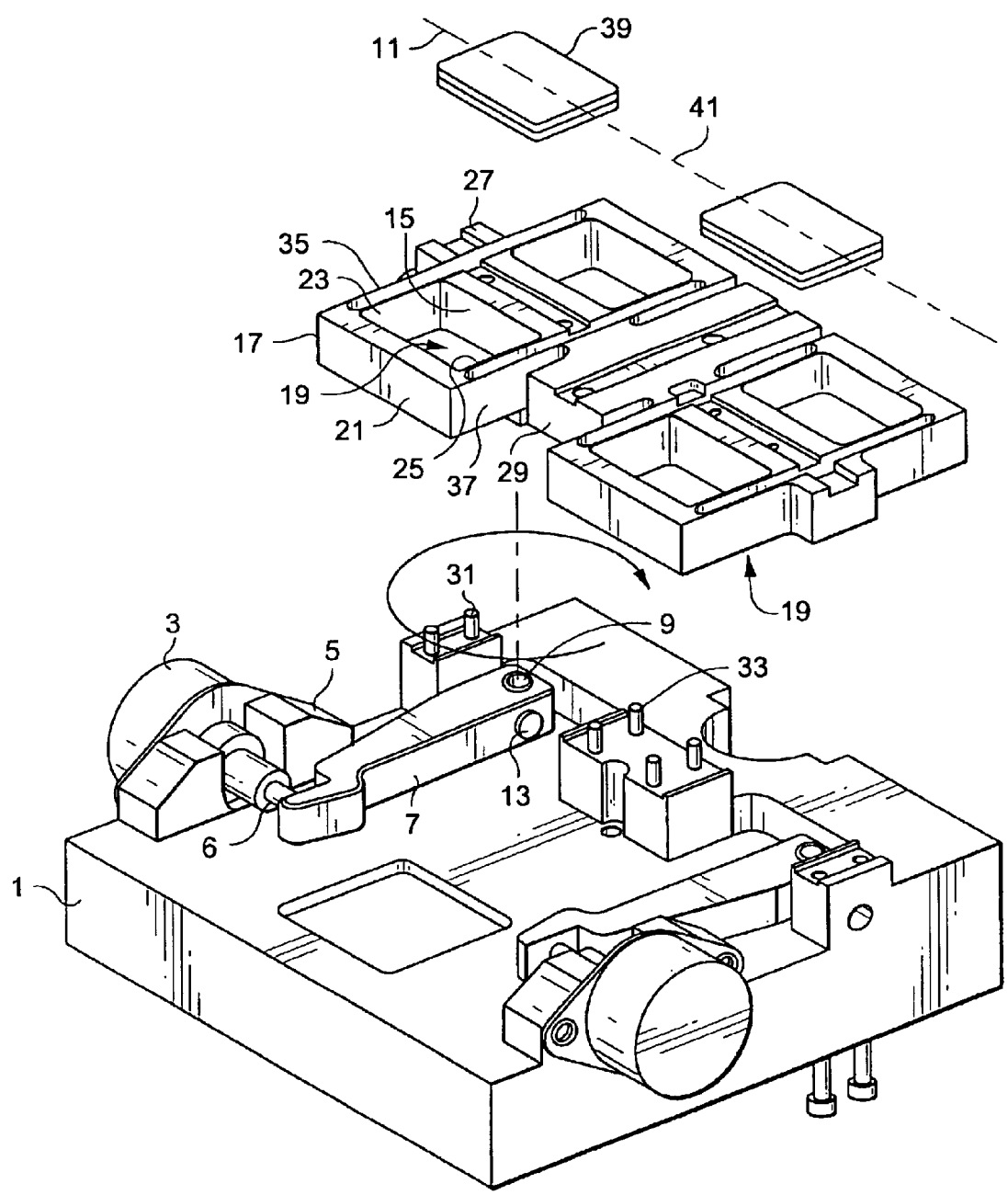
FIG. 1 is an exploded, perspective view of a base part and a parallelogram structure included in a fiber splicing device.
Figure 2:
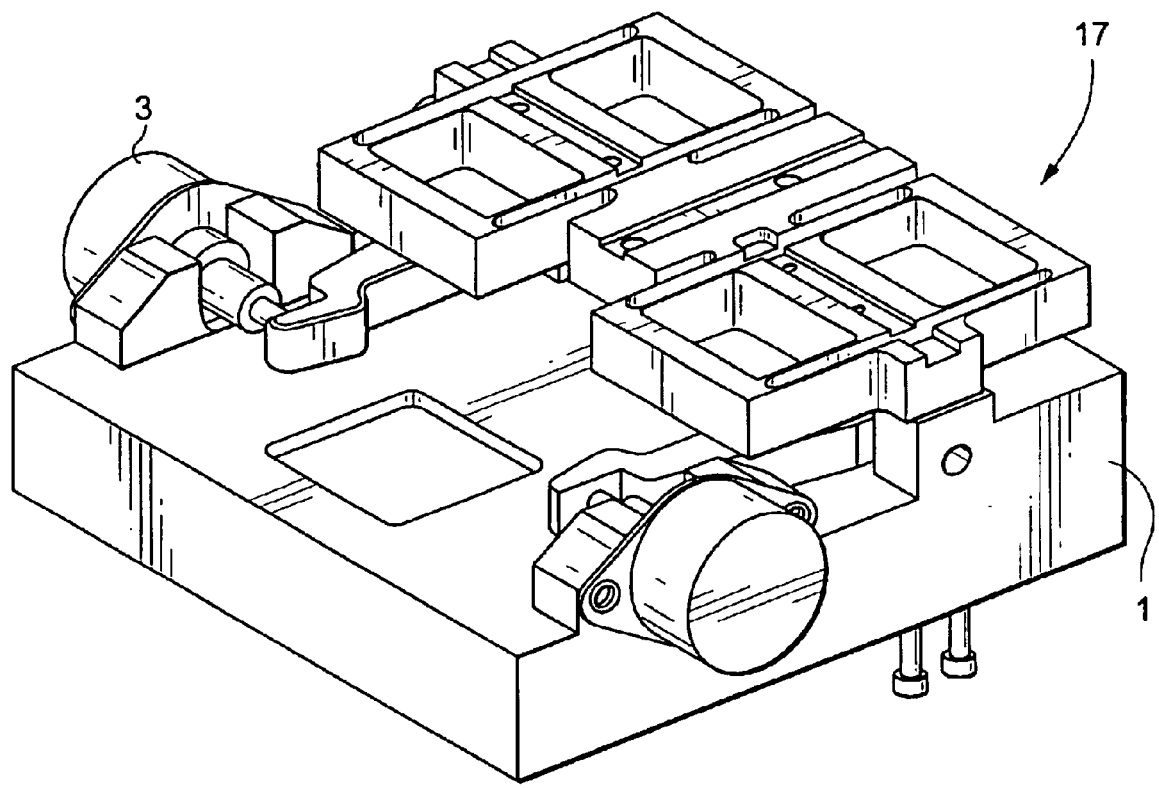
FIG. 2 is a view similar to that of FIG. 1 in which the base part and the parallelogram structure are mounted to each other.
Figure 6:
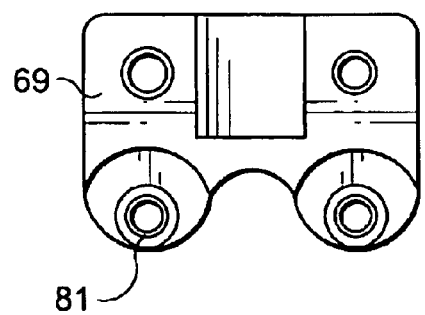
FIG. 6 is an elevational view of a half of a movable assembly seen from the inner of the assembly.

In FIGS. 1 and 2 a base part 1 of a device for splicing optical fibers is shown. The base has a generally rectangular shape as seen from above. Two linear electrical motors 3 are mounted at upstanding parts 5 of the base, the motors having actuating rods 6 acting on free ends of levers 7. The levers extend horizontally and are mounted to swing at their opposite ends in a horizontal plane about shafts 9, that have axes located at a small distance, as seen from above, from the path 11 of optical fibers which are to be or are being spliced to each other. The levers carry adjustable projecting parts 13 having a pointed shape, the points located, as seen from above, in the optical fiber path 11. When the actuator rods 6 of the motors move, the points of the projecting parts move only very little, the levers thus providing a reduction of the movement of the actuator rods.

Figure 3:
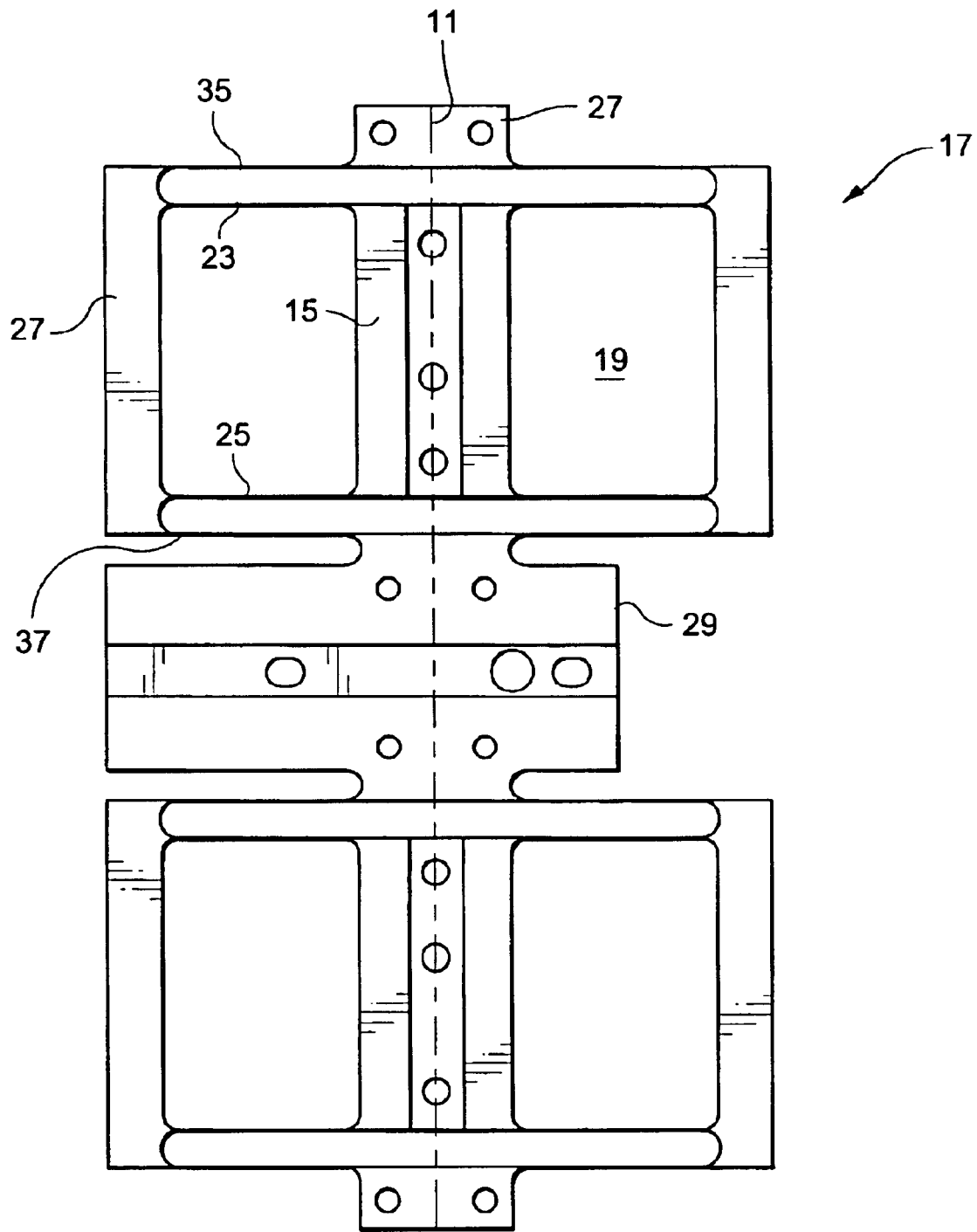
FIG. 3 is a view from above of the parallelogram structure of FIGS. 1 and 2.

The points of the projecting parts 13 are engaged with downwards projecting parts, not shown, attached to the bottom sides of movable, stiff holder portions 15 of a multiparallelogram part 17, see also FIG. 3. When the motors 3 are activated, thus the levers 7 are turned about there axes 9 and their projecting parts 13 are thereby also moved, displacing the holder portions by acting on the downwards projecting parts which are elastically maintained in contact with the tips of the lever projecting parts. The parallelogram part is made from one solid piece of metal such as aluminum having a substantially constant or uniform height or thickness. The parallelogram part 17 includes four parallelogram structures 19, each having a generally rectangular shape in a non-biased condition. The parallelogram structures allow linear movements of the holder portions, the center longitudinal axes of the holder portions always being colinear with the optical fiber path 11 as seen from above, i.e. always located in a vertical plane passing through the optical fiber path.

Each holder portion 15 is attached to two outer, stiff parallelogram sides 21 of two respective parallelograms, the holder portion itself forming the inner sides of these parallelograms. The holder portion is attached to the outer parallelogram sides through relatively thin interior lateral sides 23, 25 which can be elastically bent. The lateral sides can e.g. have a thickness of substantially 0.4 mm and a height of 7–10 mm. The outer sides 21 are also attached to end portions 27 and a center portion 29 of the parallelogram part 17, the end portions and the center portion also having axes located in a vertical plane passing through the optical fiber path 11. The end portions and the center portion are rigidly attached to the base part 1 through screws 31, 33. The outer sides 21 are attached to the stationary end and center portions through exterior lateral sides 35, 37 having a shape similar to the shape of the interior lateral sides and thus being capable of being elastically bent.

Fiber retainers or holders schematically indicated at 39 are detachably attached at the holder portions 15, possibly through some intermediate part, not shown, including permanent magnets and/or mechanical clamps. The fiber holders hold two optical fibers, not shown, which are to be spliced to each other, the fiber ends positioned at a splice position 41 located between two electrodes, not shown in these figures, between which an electric arc is formed. The fiber ends are advanced, approaching each other and finally coming in contact with each other by activating the electric motors 3 controlled by signals obtained from an image processing unit, not shown, continuously analyzing pictures taken of the fiber ends at the splice position.

Figure 4:
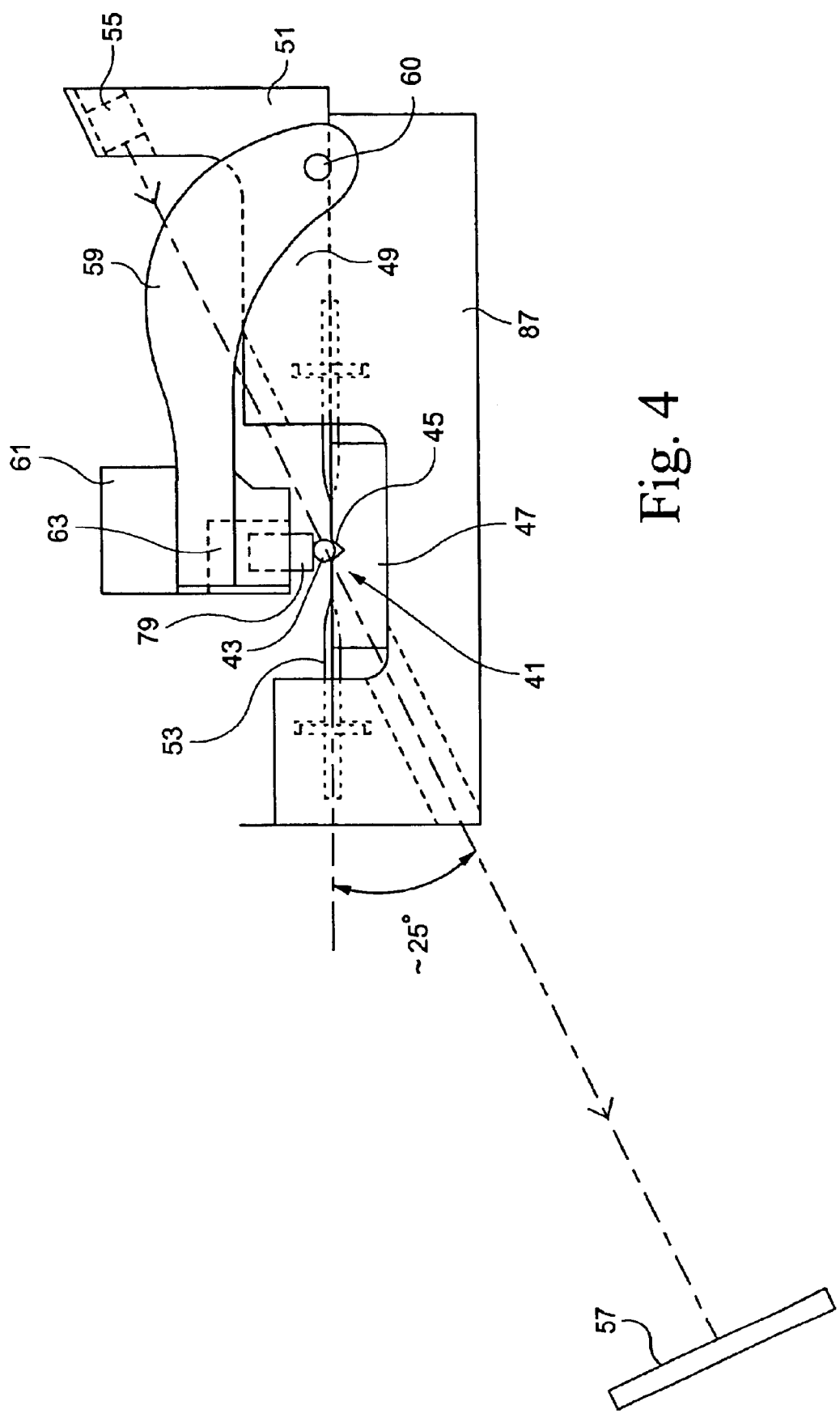
FIG. 4 is a schematic view illustrating the illumination of a splicing position and the guiding of fiber ends.

FIG. 4 is a schematic view of the device at the splice position. The fibers 43 are positioned in a V-groove 45 in a guide block 47 attached to an electrode housing base 87. A splice position base 49, have an upstanding portion 51 at its rear edge. Electrodes 53 are mounted on top surfaces of the electrode housing base not and light from a light source 55 mounted in the upstanding portion passes the splice position 41 between the points of the electrodes to the light sensitive surface 57 of a camera. The light path from the source to the camera surface has a relatively small angle to the common longitudinal axes of the electrodes. This angle is in the preferred embodiment about 25°, but should be at most 30° in order to give the splicing device a relatively small total height. The angle can generally be in the range of 15–30°.

A hold-down arm 59 is mounted to rotate or swing about an axis 60 located at the bottom of the splice position base part 49. The arm carries a weight 61 and presses in its swung-down position with a pressing unit 63 against the top surfaces of the fibers 43 to hold them firmly in the V-groove.

Figure 5:
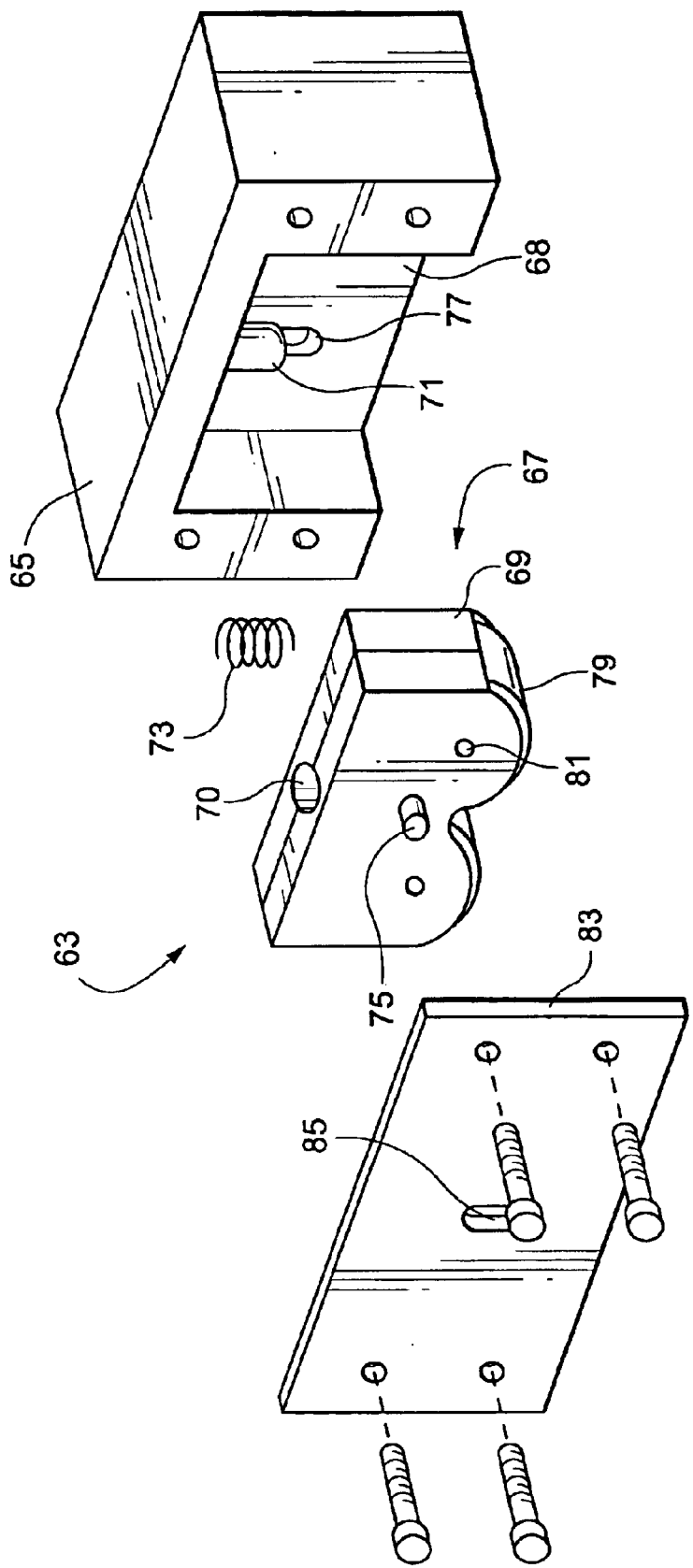
FIG. 5 is a perspective, exploded view of a hold-down unit.

As seen in FIG. 5, the pressing unit 63 comprises a frame part 65 rigidly attached to the arm 59 and an elastically biased assembly 67 mounted to slide in a recess 68 at the front side of the frame part, the sliding movement being substantially vertical in the swung-down position of the arm. The assembly 67 comprises two identical halves 69 which when mounted to each other form a cylindrical blind hole 70 extending from the top of the assembly. In this hole projects a pin 71 extending from the inner top surface of the recess 68 and is surrounded by a compression spring 73 pressing the assembly in a downward direction. The movement of the assembly is restricted by pins 75 in the halves, the pin of the rear half projecting into an elongated hole 77 in the rear wall of the recess in the frame.

At the lower side of the assembly halves roller bearings 79 are mounted to have their outer races capable of rotating about horizontal axes in the swung-down position. The horizontal axes are derived from shafts formed of short pins 81 extending from the sides of the halves which face each other.

The recess 68 is closed by a front plate 83 mounted by screws to the arm. The front plate also has an elongated hole 85 cooperating with the pin 75 on the front half.

Figure 7:
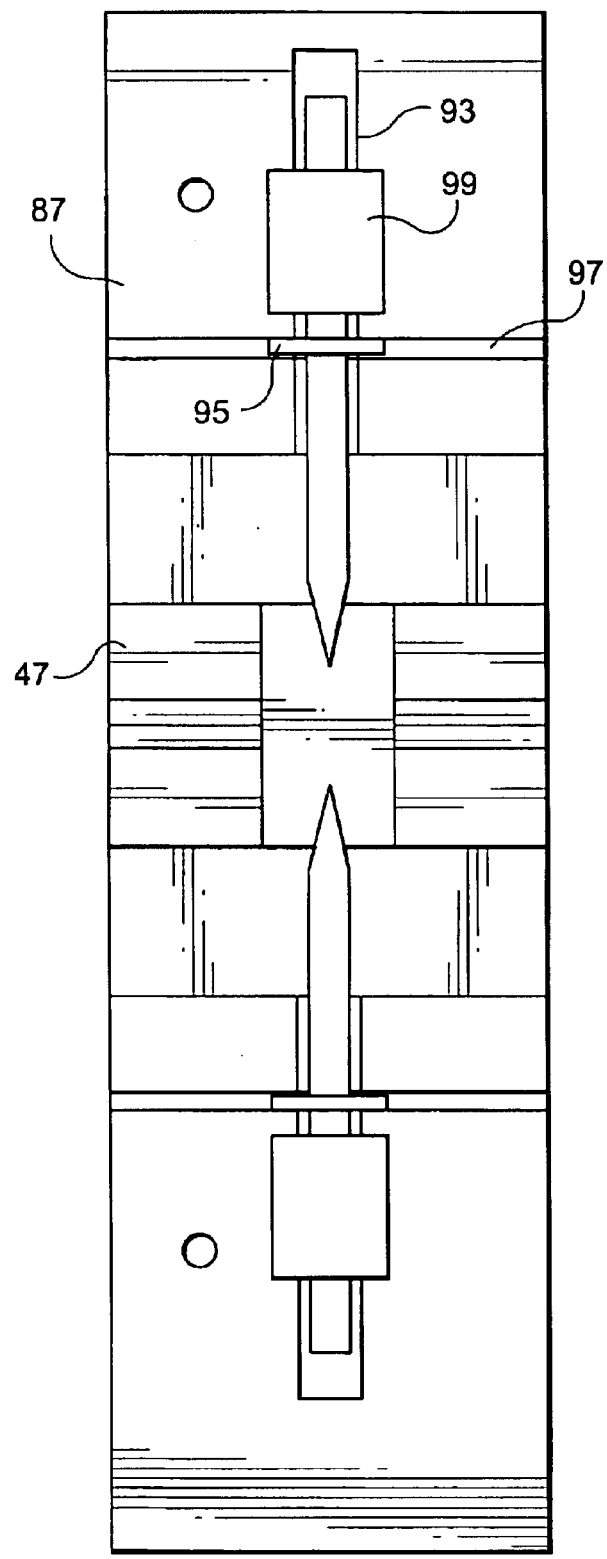
FIG. 7 is a plan view of the elect rode portion of an electrode housing.
Figure 8:
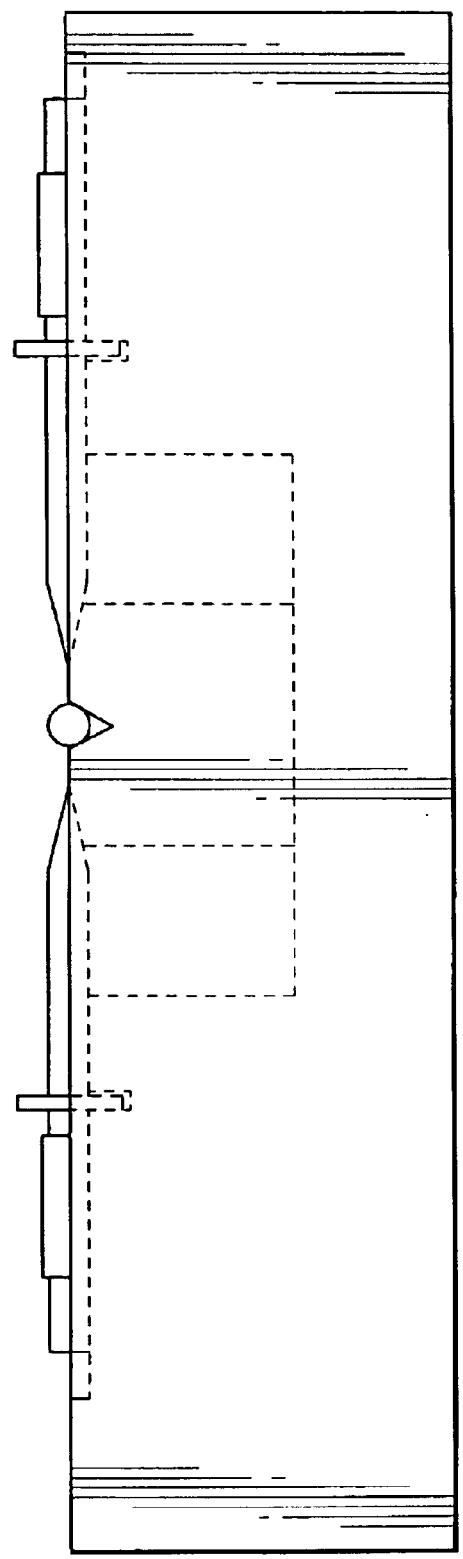
FIG. 8 is an elevational view of the electrode portion of an electrode housing.
Figure 9:
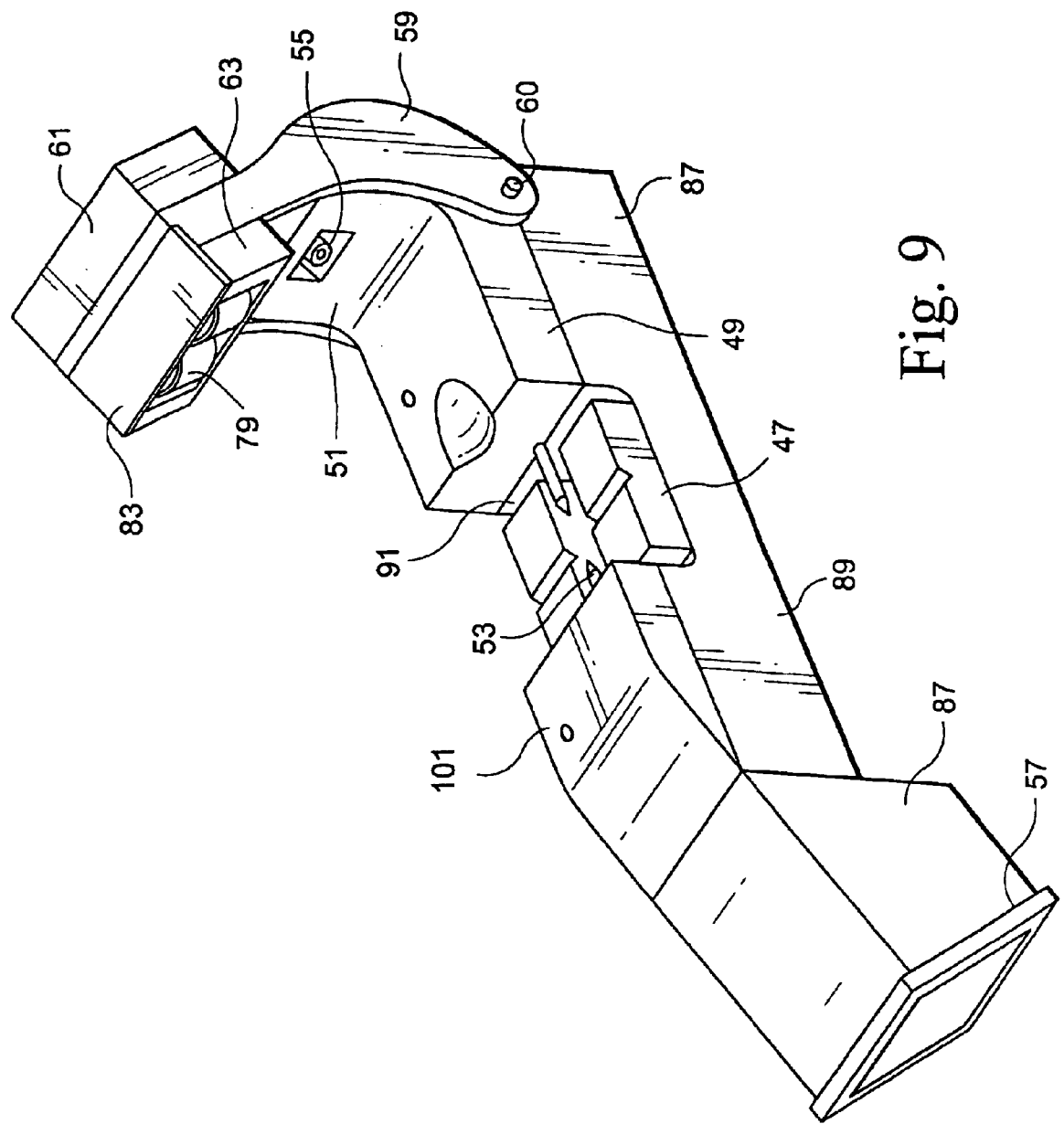
FIG. 9 is a perspective view of an electrode housing including a fiber hold-down unit, a fiber guide block and a camera.

The mounting of the electrodes 53 appears from FIGS. 7, 8 and 9. An electrode housing base 87 has an electrode carrying portion 89 of a substantially rectangular shape. In the middle of the electrode carrying portion a rectangular groove or recess 91 extending perpendicularly to the longitudinal direction of the electrode housing and parallel to the longitudinal direction of the fiber path is provided for receiving the fiber guide block 47. The electrode carrying portion has on its top side colinear grooves 93 receiving the electrodes 53. The position of the electrodes is fixed by rings 95 mounted on the electrodes, the rings cutting into the surface of the electrode material and thereby having a definite position, not being capable of sliding along the electrodes. These rings have previously been mounted, using a fixture adapted for this purpose, not shown, at a predetermined distance of the points of the electrodes. The rings 95 are placed in deep, narrow grooves 97 worked in the top surface of the electrode carrying portion 89 and having a width adapted to the thickness of the rings to give the rings and thereby the electrode points accurate, predetermined positions. The electrical connection of the electrodes is accomplished by electrode connectors 99. The electrodes are secured in their positions defined by the rings by the base surface of the splice position base 49 that is attached to the top surface portion of the electrode carrying portion located at one side of the guide block recess 91 and by the bottom surface of a securing plate 101 attached to the top surface portion of the electrode carrying portion located at the opposite side of the guide block recess.

It should be understood herein and in the claims hereof that such terms as "top", "bottom", "upwardly", "downwardly", "horizontal", "vertical" and the like have been used for illustration purposes only, in order to provide a clear and understandable description and claiming of the invention. Such terms may only describe the relative location of items and are not in any way to be construed as limiting, because the devices of invention are omnidirectional in use as can be understood by their various uses in different application fields.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A device for splicing optical fibers to each other, the device comprising fiber retaining means, heating means for beating fibers at a splice position, grooves formed in a surface of an alignment block for aligning fiber ends with each other and hold-down means for pressing and retaining fiber ends in the grooves, the hold-down means including elastically biased, circular-cylindrical surfaces acting to press on free, top surfaces of the fibers and capable of rotating, thereby imparting no longitudinal movement to the fibers.

2. The device of claim 1 further comprising roller bearings, the circular-cylindrical surfaces being outer surfaces of outer races of the roller bearings.

3. The device of claim 2 further comprising an elastically hold-down assembly in which the roller bearings are mounted allowing the outer races of roller bearing to rotate freely.

4. The device of claim 3 further comprising a holding arm to which the hold-down means are mounted, the holding arm mounted to swing to a swung-down position in which the hold-down means press on the fibers and a swung-up position in which the fiber ends are exposed and free, the hold-down assembly mounted to elastically slide in a recess of the holding arm.

5. The device of claim 4 further comprising a compression spring mounted between a surface of the recess and the hold-down assembly to elastically press the hold-down assembly to an outermost position.

6. The device of claim 5, wherein the holding arm comprises a pin projecting into a blind holde of the hold-down assembly, the compression spring mounted in the hole surrounding the pin.

7. The device of claim 1 further comprising a holding arm to which the hold-down means are mounted, the holding arm mounted to swing to a swung-down position in which the hold-down means press on the fibers and a swung-up position in which the fiber ends are exposed and free, a weight mounted to the holding arm acting to firmly hold the holding arm in the swung-down position thereof.

8. A device for splicing optical fibers to each other, the device comprising fiber retaining means, heating means for heating fibers at a splice position, and grooves formed in a surface of an alignment block for aligning fiber ends with each other, the device further comprising a multiple parallelogram structure including at least two individual parallelograms, the two parallelograms having free, stiff outer sides and inner sides at a common, stiff fiber holding portion, the parallelogram allowing the fiber holding portion to perform a linear movement.

9. The device of claim 8, wherein the fiber holding portion is attached to the free outer sides through lateral interior sides being so thin that they can be elastically bent, the bending made in only one plane.

10. The device of claim 9 further comprising a base, the parallelogram structure comprising at least one end portion and a center portion, the end portion and the center portion rigidly attached to the base of the device, the free outer sides being attached to said end portion and center portion through lateral exterior sides being so thin that they can be elastically bent, the bending made in only one plane.

11. The device of claim 9, wherein the interior and exterior lateral sides form pairs, the interior and exterior sides of such a pair extending at the side of and in parallel to each other at a constant distance of each other.

12. A device for splicing optical fibers to each other, the device comprising fiber retaining means, electrodes connected to a high voltage source for forming an electric arc between the electrodes, the electrodes having substantially cylindrical, smooth main portions continuing into electrode points and provided with positioning rings, and an electrode housing having electrode grooves or recesses for mounting the electrodes in the electrode grooves or recesses, wherein the positioning rings having inner cutting edges penetrating into the surface material of the main portions, the positioning rings located at a predetermined distance from the electrode points and received by positioning grooves having a width substantially agreeing with that of the rings to give the electrode points accurate, predetermined positions.

13. The device of claim 12, further comprising a hold-down base that is attached to the electrode housing and includes an upstanding portion, a light source mounted in the upstanding portion illuminating a splicing position located between the electrode points in a relatively small angle of at most 30° in relation to an axis line of the electrodes, and a camera located to receive light from the light source passing the splicing position.

14. The device of claim 12, wherein the hold-down base secures one of the electrodes in the electrode groove or recess provided therefor.

15. The device of claim 12, further comprising a holding arm mounted to swing to a swung-down position for pressing the fiber ends to accurate positions and a swung-up position in which the fiber ends are exposed and freely available.

16. The device of claim 15, further comprising hold-down means included in or mounted to the holding arm, the hold-down means having pressing surfaces for pressing on the fiber ends in the swung-down position.

17. A device for splicing optical fibers to each other, the device comprising fiber retaining means, electrodes connected to a high voltage source for forming an electric arc between the electrodes, the electrodes having substantially cylindrical, smooth main portions that continue into electrode points, and an electrode housing for mounting the electrodes, the device further comprising a hold-down base that is attached to the electrode housing and includes an upstanding portion, a light source mounted in the upstanding portion illuminating a splicing position located between the electrode points in a relatively small angle of at most 30° in relation to an axis line of the electrodes, and a camera located to receive light from the light source passing the splicing position.

18. The device of claim 17, wherein the relatively small angle is in the range of 15–30°.

19. The device of claim 17, wherein the relatively small angle is substantially 25°.

* * * * *